(12) United States Patent
Nonaka

(10) Patent No.: US 12,143,455 B2
(45) Date of Patent: Nov. 12, 2024

(54) INFORMATION PROCESSING METHOD, NON-TRANSITORY COMPUTER READABLE RECORDING MEDIUM STORING INFORMATION PROCESSING PROGRAM, AND INFORMATION PROCESSING DEVICE

(71) Applicant: Panasonic Intellectual Property Corporation of America, Torrance, CA (US)

(72) Inventor: Takeshi Nonaka, Chiba (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/381,433

(22) Filed: Oct. 18, 2023

(65) Prior Publication Data

US 2024/0048634 A1 Feb. 8, 2024

Related U.S. Application Data

(63) Continuation of application No. PCT/JP2022/004623, filed on Feb. 7, 2022.

(30) Foreign Application Priority Data

Apr. 23, 2021 (JP) .................................. 2021-073014

(51) Int. Cl.
*G06F 15/173* (2006.01)
*H04L 67/306* (2022.01)
*H04L 67/51* (2022.01)

(52) U.S. Cl.
CPC ............ *H04L 67/51* (2022.05); *H04L 67/306* (2013.01)

(58) Field of Classification Search
CPC .............................. H04L 67/51; H04L 67/306
See application file for complete search history.

(56) References Cited

U.S. PATENT DOCUMENTS

2018/0182389 A1\* 6/2018 Devaraj ................ H04L 51/224
2018/0367629 A1\* 12/2018 Slosar ..................... H04L 67/55

FOREIGN PATENT DOCUMENTS

| JP | 2014-071874 | 4/2014 |
| JP | 2014-215923 | 11/2014 |
| JP | 2015-018502 | 1/2015 |
| JP | 2016-057770 | 4/2016 |
| JP | 2017-004053 | 1/2017 |

OTHER PUBLICATIONS

International Search Report issued in International Pat. Appl. No. PCT/JP2022/004623, dated Apr. 5, 2022, along with an English translation thereof.

\* cited by examiner

*Primary Examiner* — Joseph R Maniwang
(74) *Attorney, Agent, or Firm* — Greenblum & Bernstein, P.L.C.

(57) ABSTRACT

An ID management server acquires a plurality of user IDs respectively identifying a plurality of users associated with a group ID identifying a group to which the users belong, acquires, by using the user IDs, at least one service information piece about at least one available service among a plurality of service information pieces about a plurality of services available for each of the user IDs, and outputs the acquired at least one service information piece in the group to a shared terminal shared by the users associated with the group ID to cause the shared terminal to show the at least one service information piece in the group.

7 Claims, 16 Drawing Sheets

| FAMILY ID | USER ID | SERVICE ID |
|---|---|---|
| FAMILY ID#1 | USER ID#1 | SERVICE ID#1 |
| | USER ID#2 | SERVICE ID#1, SERVICE ID#2 |
| | USER ID#3 | SERVICE ID#1, SERVICE ID#2 |
| | USER ID#4 | SERVICE ID#1, SERVICE ID#3 |
| FAMILY ID#2 | USER ID#5 | SERVICE ID#1 |
| | USER ID#6 | SERVICE ID#2 |
| ... | ... | ... |

FIG.3

| FAMILY ID | USER ID | SERVICE ID |
|---|---|---|
| FAMILY ID#1 | USER ID#1 | SERVICE ID#1 |
| | USER ID#2 | SERVICE ID#1,SERVICE ID#2 |
| | USER ID#3 | SERVICE ID#1,SERVICE ID#2 |
| | USER ID#4 | SERVICE ID#1,SERVICE ID#3 |
| FAMILY ID#2 | USER ID#5 | SERVICE ID#1 |
| | USER ID#6 | SERVICE ID#2 |
| ... | ... | ... |

FIG.4

| FAMILY ID | SHARED TERMINAL | INDIVIDUAL TERMINAL |
|---|---|---|
| FAMILY ID#1 | SERVICE ID#1<br>SERVICE ID#2 | SERVICE ID#2<br>SERVICE ID#3 |
| FAMILY ID#2 | SERVICE ID#1<br>SERVICE ID#2 | SERVICE ID#2 |
| ... | ... | ... |

FIG.5

| USER ID | SERVICE ID#1 | SERVICE ID#2 | SERVICE ID#3 | ... |
|---|---|---|---|---|
| USER ID#1 | PERMISSION | – | – | ... |
| USER ID#2 | PROHIBITION | PERMISSION | – | ... |
| USER ID#3 | PERMISSION | PERMISSION | – | ... |
| USER ID#4 | PERMISSION | – | PERMISSION | ... |
| ... | ... | ... | ... | ... |

FIG.11

| USER ID | SERVICE ID#1 | | | |
|---|---|---|---|---|
| | FIRST TYPE | SECOND TYPE | THIRD TYPE | ... |
| USER ID#1 | ACQUIRE | NOT ACQUIRE | NOT ACQUIRE | ... |
| USER ID#2 | ACQUIRE | ACQUIRE | NOT ACQUIRE | ... |
| USER ID#3 | ACQUIRE | NOT ACQUIRE | NOT ACQUIRE | ... |
| ... | ... | ... | ... | ... |

DELIVERY SCHEDULE NOTIFICATION SERVICE

ABSENCE NOTIFICATION SERVICE

DELIVERY DATE AND TIME CHANGE SERVICE

DELIVERY DESTINATION CHANGE SERVICE

INFORMATION PROCESSING METHOD, NON-TRANSITORY COMPUTER READABLE RECORDING MEDIUM STORING INFORMATION PROCESSING PROGRAM, AND INFORMATION PROCESSING DEVICE

FIELD OF INVENTION

This disclosure relates to a technology of acquiring, by using a user ID identifying a user, service information available for the user ID.

BACKGROUND ART

For instance, Patent Literature 1 discloses a data sharing device and a data sharing method for effectively giving an access right to share data in a group.

Patent Literature 1 considers the access right to share data in the group. However, the conventional technology lacks discussion as to what terminal is used for sharing services associated with a plurality of IDs, and thus needs more improvement.

Patent Literature 1: Japanese Unexamined Patent Publication No. 2017-004053

SUMMARY OF THE INVENTION

This disclosure has been achieved to solve the drawbacks described above, and has an object of providing a technology for permitting a plurality of users to share a service information piece associated with each of a plurality of user IDs and improving the convenience of the users.

An information processing method according to this disclosure, by a computer, includes: acquiring a plurality of user IDs respectively identifying a plurality of users associated with a group ID identifying a group to which the users belong; acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group.

The disclosure permits a plurality of users to share a service information piece associated with each of a plurality of user IDS, and achieves improvement in the convenience of the users.

BRIEF DESCRIPTION OF THE DRAWINGS

FIG. 3 shows an example of an ID management table stored in an ID management table storage part in the embodiment.

FIG. 4 shows an example of an output destination management table stored in an output destination management table storage part in the embodiment.

FIG. 5 shows an example of a setting change management table stored in a setting change management table storage part in the embodiment.

FIG. 11 shows an example of a type management table stored in the ID management table storage part.

DETAILED DESCRIPTION

Figure 1:
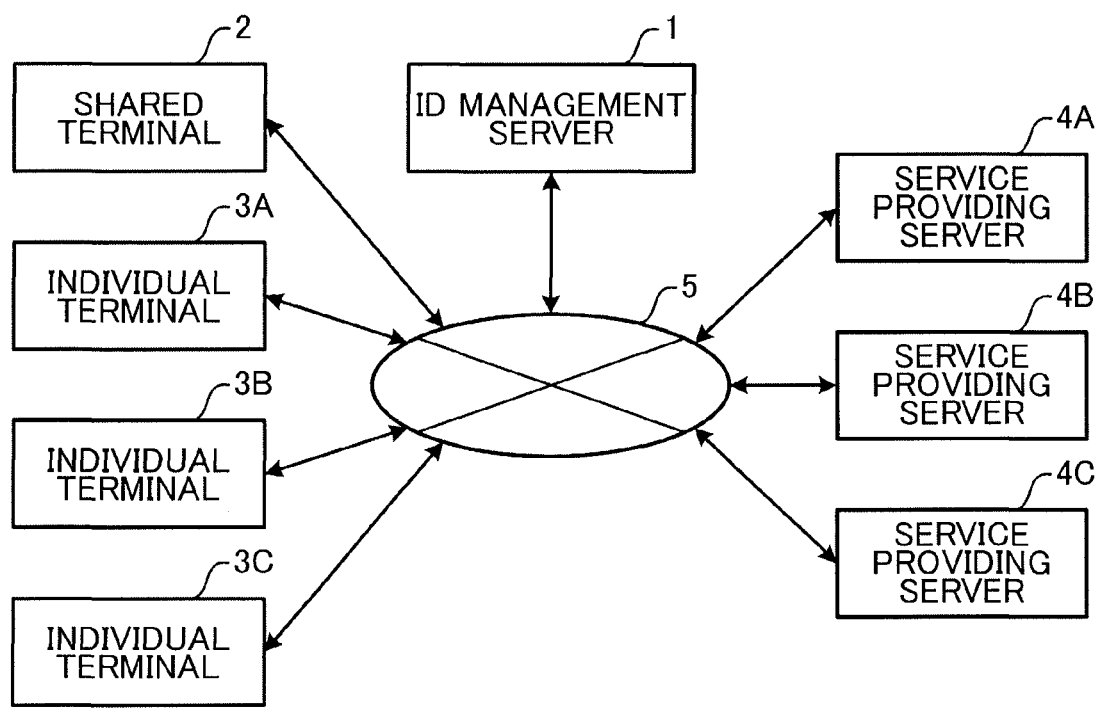
FIG. 1 shows an example of a configuration of an ID management system in an embodiment of the disclosure.

Knowledge Forming the Basis of the Present Disclosure

When a user is provided with a predetermined service by using an individual terminal, the individual terminal needs to receive an input of a user ID peculiar to the user and send the received user ID to a service providing server. By contrast, a shared terminal shared by a plurality of users has drawbacks that the users are required to individually input their user IDs even when the users are provided with the same service, and thus the convenience is lowered.

Moreover, for example, Patent Literature 1 discloses sharing data with a plurality of group joining terminals respectively owned by a plurality of users, but fails to disclose sharing a service associated with each of a plurality of user IDs.

To solve the drawbacks, an information processing method according to one aspect of the disclosure, by a computer, includes: acquiring a plurality of user IDs respectively identifying a plurality of users associated with a group ID identifying a group to which the users belong; acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group.

According to this configuration, a plurality of user IDs associated with a group ID identifying a group to which a plurality of users belong is acquired, at least one service information piece about at least one available service among a plurality of service information pieces about a plurality of services available for each of the user IDs is acquired, and the acquired at least one service information piece is output in the group to the shared terminal. Then, the shared terminal shared by the users shows the at least one service information piece in the group.

Therefore, the users can share the service information piece associated with each of the user IDs, and the convenience of the users is improvable.

In the information processing method, in the acquisition of the at least one service information piece, the user IDs may be sent to a service providing server that provides the service information pieces, and the at least one service information piece about the available service may be received from the service providing server.

According to this configuration, the user IDs are sent to the service providing server that provides the service information pieces, and the at least one service information piece about the available service is received from the service providing server. Hence, the at least one service information piece is directly acquirable from the service providing server.

In the information processing method, in the output of the at least one service information piece, the acquired at least one service information piece may be output to the shared terminal in the group, and the acquired at least one service information piece may be output to a plurality of individual terminals respectively associated with the user IDs.

According to this configuration, the acquired at least one service information piece is output to the shared terminal in the group, and the acquired at least one service information piece is output to the individual terminals respectively associated with the user IDs.

Therefore, the at least one service information piece is presentable before the individual terminals respectively associated with the user IDs as well as before the shared terminal.

In the information processing method, in the output of the at least one service information piece, it may be determined, with reference to an output destination management table predetermining output of the service information piece to either the shared terminal or the individual terminals for each of a plurality of service providing servers, to output the acquired at least one service information piece to either the shared terminal or the individual terminals for the service providing server having provided the at least one service information piece.

This configuration enables a facilitated determination on the output of the at least one service information piece to either the shared terminal or the individual terminals for the service providing server having provided the at least one service information piece.

In the information processing method, the services may include a set content change service of receiving a change which has been made in a set content by a user. The information processing method may further include: receiving, from the shared terminal, a setting change request of demanding a change in the set content in the set content change service by a certain user of the users; and, with reference to a setting change management table predetermining permission or prohibition of a change in a set content in the set content change service by the users for the user IDs, transmitting the setting change request to the service providing server by using a user ID identifying the certain user when the change in the set content in the set content change service by the users is permitted for the user ID identifying the certain user, and prohibiting the change in the set content in the set content change service by the certain user when the change in the set content in the set content change service by the users is not permitted for the user ID identifying the certain user.

According to this configuration, when a change in a set content in the set content change service by a plurality of users is permitted, each of the users is allowed to change the set content. Contrarily, when the change in the set content in the set content change service by the plurality of users is not permitted, the users are prohibited from changing the set content. This configuration thus can prevent users other than a certain user from changing the set content.

In the information processing method, the service information pieces may include service information pieces about a plurality of types of services, and, in the acquisition of the at least one service information piece, it may be determined, with reference to a type management table predetermining acquisition or non-acquisition of the service information piece about each of the types for the user IDs, at least one type concerning service information pieces to be acquired among the types for each of the user IDs, and an available service information piece of at least one type may be acquired, by using the user IDs, from the determined service information pieces of the at least one type.

According to this configuration, acquisition or non-acquisition of a service information piece is determined for each of the types of services, and thus the acquisition of service information is settable in more detail.

Moreover, the disclosure can be realized as: the information processing method executing the above-described distinctive ways; and an information processing device including each distinctive feature corresponding to the distinctive ways executed by the information processing method. Additionally, the disclosure can be realized by a computer program causing a computer to execute the distinctive ways included in the information processing method. From these perspectives, the same advantageous effects as those of the information processing method are achievable in the following other aspects.

A non-transitory computer readable recording medium storing an information processing program according to another aspect of the disclosure causes a computer to execute: acquiring a plurality of user IDs respectively identifying a plurality of users associated with a group ID identifying a group to which the users belong; acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group.

An information processing device according to further another aspect of the disclosure includes: a first acquisition part that acquires a plurality of user IDs respectively identifying a plurality of users associated with a group ID identifying a group to which the users belong; a second acquisition part that acquires, by using the user IDs, at least one service information piece about at least one available service among a plurality of service information pieces about a plurality of services available for each of the user IDs; and an output part that outputs the acquired at least one service information piece in the group to a shared terminal shared by the users associated with the group ID to cause the shared terminal to show the at least one service information piece in the group.

Hereinafter, an embodiment of the disclosure will be described with reference to the accompanying drawings. It should be noted that the following embodiment illustrates one example of the disclosure, and does not delimit the technical scope of the disclosure.

Embodiment

FIG. 1 shows an example of a configuration of an ID management system in an embodiment of the disclosure.

The ID management system shown in FIG. 1 includes an ID management server 1, a shared terminal 2, individual terminals 3A, 3B, 3C, and service providing servers 4A, 4B, 4C.

The ID management server 1 manages a plurality of user IDs respectively identifying a plurality of users, a family ID identifying a group to which the users belong, and a service ID identifying a service provider providing a service available to each of the users. The users form, for example, a family.

The ID management server 1 is communicably connected to the shared terminal 2, the individual terminals 3A, 3B, 3C, and the service providing servers 4A, 4B, 4C via a network 5. The network 5 includes, for example, the internet. The ID management server 1 is arranged outside a house where the users live, but may be arranged inside the house.

Examples of the shared terminal 2 include a controller located in a living room in the house of the users for totally controlling a plurality of appliances used in the house. The shared terminal 2 includes a display part, an input part, and a communication part. The shared terminal 2 may include a touch screen having operability of the display part and the input part. The shared terminal 2 is shared by the users and used by the users. The shared terminal 2 may include a tablet computer or a personal computer to be used by the users.

Examples of each of the individual terminals 3A, 3B, 3C include a smartphone, a tablet computer, and a personal computer owned by each of the users. Each of the individual terminals 3A, 3B, 3C includes a display part, an input part, and a communication part. Each of the individual terminals 3A, 3B, 3C may include a touch screen having operability of the display part and the input part. The individual terminal 3A is owned by a first user among the users, the individual terminal 3B is owned by a second user among the users, and the individual terminal 3C is owned by a third user among the users. Here, not all the users have to own their individual terminals. In other words, there may be a user who does not own his/her individual terminal.

Each of the service providing servers 4A, 4B, 4C provides predetermined service information. The service providing servers 4A, 4B, 4C are respectively run by service providers different from one another. For instance, the service providing server 4A is run by a service provider providing article delivery services to transmit service information pieces about article delivery services.

The service information pieces include a plurality of service information pieces about a plurality of types of services. For example, when the service provider provides article delivery services, the services include: an ID registration service of registering a user ID identifying a user; a delivery schedule notification service of notifying the user of a scheduled delivery date and time; an absence notification service of notifying the user of delivery in absence of the user; a redelivery request service of requesting redelivery of an article; a delivery date and time change service of changing the scheduled delivery date and time of the article; and a delivery destination change service of changing the delivery destination of the article.

The number of individual terminals is not limited to three, and may be one, two, or four or more. The number of service providing servers is not limited to three, and may be one, two, or four or more.

Figure 2:
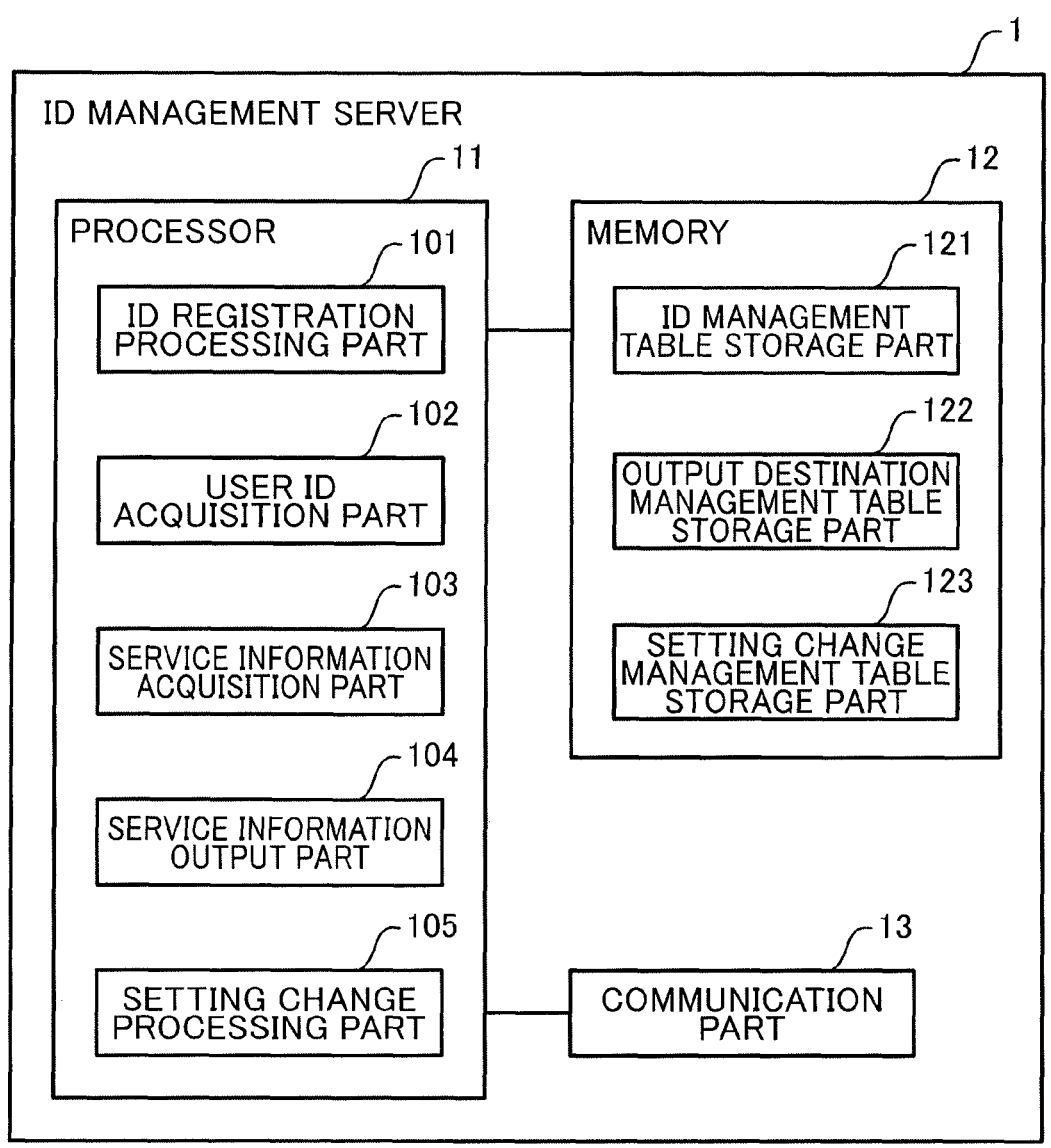
FIG. 2 shows an example of a configuration of an ID management server in the embodiment of the disclosure.

FIG. 2 shows an example of a configuration of the ID management server 1 in the embodiment of the disclosure.

The ID management server 1 shown in FIG. 2 includes a processor 11, a memory 12, and a communication part 13.

The processor 11 includes, for example, a CPU (central processing unit). The processor 11 realizes an ID registration processing part 101, a user ID acquisition part 102, a service information acquisition part 103, a service information output part 104, and a setting change processing part 105.

For instance, the memory 12 includes a storage device, such as a RAM (Random Access Memory), an HDD (Hard Disk Drive), and an SSD (Solid State Drive), or a flash memory, for storing various kinds of information. The memory 12 realizes an ID management table storage part 121, an output destination management table storage part 122, and a setting change management table storage part 123.

The ID registration processing part 101 registers, in an ID management table, a plurality of user IDs respectively identifying a plurality of users, a family ID (group ID) identifying a group to which the users belong, and a service ID identifying a service provider providing a service available to each of the users in association with one another.

Here, the shared terminal 2 transmits, to the ID management server 1, an ID registration request for registering each user ID, the family ID, and the service ID in association with one another in the ID management table. The ID registration request contains the user ID, the family ID, and the service ID. The user ID includes an identifier indicated by, for example, a mail address of the individual terminal owned by the user to uniquely identify the user. The user ID is further used to log in the service providing server and acquire service information from the service providing server. When the family ID is already registered in the ID management server 1, the shared terminal 2 sends the registered family ID. By contrast, when the family ID is not registered in the ID management server 1, the shared terminal 2 sends a new family ID.

The communication part 13 of the ID management server 1 receives the ID registration request transmitted by the shared terminal 2. When the communication part 13 receives the ID registration request, the ID registration processing part 101 determines whether a family ID contained in the ID registration request is already registered in the ID management table. When the family ID contained in the ID registration request is already registered in the ID management table, the ID registration processing part 101 registers, in the ID management table, the user ID and the service ID in association with the registered family ID. When the family ID contained in the ID registration request is not registered in the ID management table, the ID registration processing part 101 registers a new family ID, the user ID, and the service ID in association with one another in the ID management table.

The ID management table storage part 121 stores the ID management table associating the user IDs, the family ID (group ID), and the service ID with one another.

FIG. 3 shows an example of the ID management table stored in the ID management table storage part 121 in the embodiment.

The ID management table associates a family ID, a plurality of user IDs identifying a plurality of users belonging to a group identified by the family ID, and a service ID identifying a service providing provider providing a service available to each of the users. The ID management table shown in FIG. 3 associates, for example, a user ID#1, a user ID#2, a user ID#3, and a user ID#4 with a family ID#1. Moreover, the user ID#1 is associated with a service ID#1. This means that a user identified by the user ID#1 receives a service provided from a service provider identified by the service ID#1. Moreover, each of the user ID#2 and the user ID#3 is associated with the service ID#1 and a service ID#2, and the user ID#4 is associated with the service ID#1 and a service ID#3.

The ID management table storage part 121 may store a single ID management table associating all family IDs with relevant user IDs, or may store a plurality of ID management tables created for each of the family IDs.

The ID management table stores a service ID and an address of a corresponding service providing server run by a service provider identified by the service ID in association with each other.

The user ID) acquisition part 102 acquires a plurality of user IDs respectively identifying a plurality of users associated with a family ID (group ID) identifying a group to which a plurality of users belongs. The user ID acquisition part 102 acquires from the ID management table the user IDs associated with the family ID.

The service information acquisition part 103 acquires, by using the user IDs, at least one service information piece about at least one available service among a plurality of service information pieces available by the service providing server for each of the user IDs. The service information acquisition part 103 sends the user IDs to the service providing server, and receives the at least one service information piece about the at least one available service from the service providing server.

In the embodiment, the service information acquisition part 103 may send the user IDs to the service providing server, and receive, via a mail server different from the service providing server, the at least one service information piece about the at least one available service sent from the service providing server. In this case, upon receiving the user IDs, the service providing server generates at least one service information piece about at least one available service among a plurality of service information pieces about a plurality of services available for each of the user IDs, and transmits the generated at least one service information piece to the mail server. The service information acquisition part 103 receives the at least one service information piece from the mail server.

In the embodiment, the service information acquisition part 103 may send the user IDs to the mail server different from the service providing server, and receive, from the mail server, the at least one service information piece about the at least one available service sent from the service providing server. In this case, the service providing server periodically generates at least one service information piece about at least one available service among the service information pieces about the services available for each of the user IDs, and periodically transmits the generated at least one service information piece to the mail server. The service information acquisition part 103 accesses to the mail server to receive the at least one service information piece from the mail server.

The service information output part 104 outputs the at least one service information piece acquired by the service information acquisition part 103 in the group to the shared terminal 2 shared by the users associated with the family ID (group ID) to cause the shared terminal 2 to show the at least one service information piece in the group. The service information output part 104 outputs the at least one service information piece in the group to the shared terminal 2 via the communication part 13. In other words, the communication part 13 transmits the at least one service information piece in the group to the shared terminal 2. The shared terminal 2 receives the at least one service information piece, and displays the received at least one service information piece in the group.

In the output of the at least one service information piece, the service information output part 104 outputs the acquired at least one service information piece in the group to the shared terminal 2, and further outputs the acquired at least one service information piece to the individual terminals respectively associated with the user IDs. At this time, the service information output part 104 determines, with reference to an output destination management table predetermining output of a service information piece to either the shared terminal or the individual terminals for each of a plurality of service providing servers, to output the acquired at least one service information piece to either the shared terminal or the individual terminals for the service providing server having provided the at least one service information piece.

The output destination management table storage part 122 stores, in advance, the output destination management table predetermining output of the service information piece to either the shared terminal or the individual terminals for each of the service providing servers.

FIG. 4 shows an example of the output destination management table stored in the output destination management table storage part 122 in the embodiment.

The output destination management table associates a family ID, a service ID identifying a service provider providing a service information piece to be output to the shared terminal, and a service ID identifying a service provider providing a service information piece to be output to each individual terminal with one another. The output destination management table shown in FIG. 4 associates, for example, a service ID#1 and a service ID#2 each for a service provider providing a service information piece to be output to the shared terminal, and the service ID#2 and a service ID#3 each for a service provider providing a service information piece to be output to the individual terminal with a family ID#1. In this case, when an acquired service information piece indicates a service information piece relevant to the service ID#1, the service information output part 104 outputs the service information piece to the shared terminal 2. When the acquired service information piece indicates a service information piece relevant to the service ID#2, the service information output part 104 outputs the service information piece to the shared terminal 2 and the individual terminals. When the acquired service information piece indicates a service information piece relevant to the service ID#3, the service information output part 104 outputs the service information piece to the individual terminals.

The communication part 13 receives, from the shared terminal 2, a setting change request of demanding a change in a set content in a set content change service by a certain user among the users. For instance, when the set content change service represents a delivery date and time change service, the shared terminal 2 transmits, to the ID management server 1, a setting change request (delivery date and time change request) of demanding a change in a delivery date and time by the certain user. Alternatively, for instance, when the set content change service represents a delivery destination change service, the shared terminal 2 transmits, to the ID management server 1, a setting change request (delivery destination change request) of demanding a change in a delivery destination by the certain user.

The setting change processing part 105 refers to a setting change management table predetermining permission or prohibition of a change in a set content in the set content change service by the users for the user IDs. The setting change processing part 105 transmits the setting change request to a service providing server by using a user ID identifying the certain user when the change in the set content in the set content change service by the users is permitted for the user ID identifying the certain user. The setting change processing part 105 prohibits the change in the set content in the set content change service by the certain user when the change in the set content in the set content change service by the users is not permitted for the user ID identifying the certain user.

The setting change management table storage part 123 stores, in advance, the setting change management table predetermining the permission or the prohibition of a change in the set content in the set content change service by the users for the user IDs.

FIG. 5 shows an example of the setting change management table stored in the setting change management table storage part 123 in the embodiment.

The setting change management table associates user IDs with permission or prohibition of a change, by a plurality of users, in a set content in a set content change service provided by a service provider identified by a service ID.

In the setting change management table shown in FIG. 5, for instance, a user having a user ID#1 permits a change, by a plurality of users, in a set content in a set content change service provided by a service provider identified by a service ID#1. A user having a user ID#2 does not permit a change in the set content, by the users, in the set content change service provided by the service provider identified by the service ID#1, and permits a change in a set content, by the users, in a set content change service provided by a service provider identified by a service ID#2. A user having a user ID#3 permits a change in the set content, by the users, in the set content change service provided by the service provider identified by the service ID#1, and further permits a change in the set content, by the users, in the set content change service provided by the service provider identified by the service ID#2. A user having a user ID#4 permits a change in the set content, by the users, in the set content change service provided by the service provider identified by the service ID#1, and further permits a change in a set content, by the users, in a set content change service provided by a service provider identified by a service ID#3.

For instance, the communication part 13 receives, from the shared terminal 2, a setting change request of demanding a change in the set content, by using the user ID#1, in the set content change service provided by the service provider identified by the service ID#1. In this case, the user having the user ID#1 permits the change in the set content, by the users, in the set content change service provided by the service provider identified by the service ID#1. Therefore, the setting change processing part 105 transmits, by using the user ID#1, the setting change request to the service providing server.

By contrast, for instance, the communication part 13 receives, from the shared terminal 2, a setting change request of demanding a change in the set request, by using the user ID#2, in the set content change service provided by the service provider identified by the service ID#1. In this case, the user having the user ID#2 does not permit the change in the set content, by the users, in the set content change service provided by the service provider identified by the service ID#1. Therefore, the setting change processing part 105 prohibits the change in the set content by using the user ID#2.

The shared terminal 2 is shared by the user having the user ID#1 and the user having the user ID#2. The user having the user ID#1 permits a change in the set content of the service ID#1 by other users in addition to the user having the user ID#1. Hence, the user having the user ID#2 can change, by using the user ID#1, the set content by the user having the user ID#1 in the set content change service provided by the service provider identified by the service ID#1.

By contrast, the user having the user ID#2 does not permit a change in the set content of the service ID#1 by other users except for the user having the user ID#2. Hence, the user having the user ID#1 cannot change, by using the user ID#2, the set content by the user having the user ID#2 in the set content change service provided by the service provider identified by the service ID#1.

The setting change processing part 105 may display, on the shared terminal 2, a screen image for receiving an input of the user ID and a password from the user having the user ID#2 when prohibiting the change, by using the user ID#2, in the set content. The shared terminal 2 receives the input of the user ID and the password, and sends the input user ID and password to the ID management server 1. When the user ID and the password sent by the shared terminal 2 respectively match the user ID#2 and the password corresponding to the user ID#2, the setting change processing part 105 may transmit a setting change request to the service providing server by using the user ID#2.

Subsequently, an ID registration process by the ID management system in the embodiment of the disclosure will be described.

Figure 6:
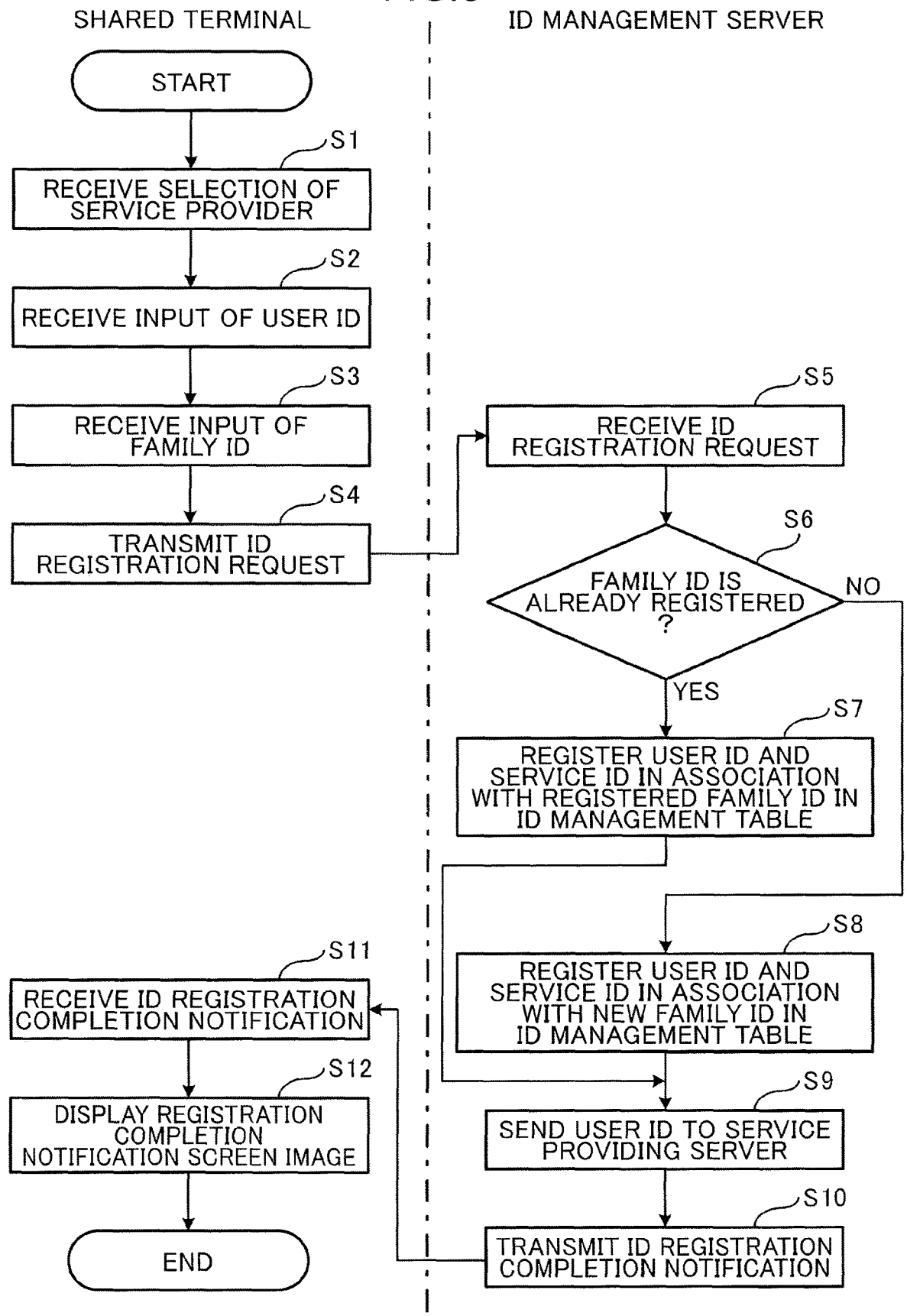
FIG. 6 is a flowchart explaining an ID registration process by the ID management system in the embodiment of the disclosure.

FIG. 6 is a flowchart explaining the ID registration process by the ID management system in the embodiment of the disclosure. The ID registration process is performed by the shared terminal 2 and the ID management server 1, but may be performed by any one of the individual terminals 3A, 3B, and 3C and the ID management server 1. The ID registration process may be one (ID registration service) of a plurality of types of services of the article delivery service.

First, in step S1, the shared terminal 2 receives selection, by a user, of a service provider providing a service available to the user.

Figure 7:
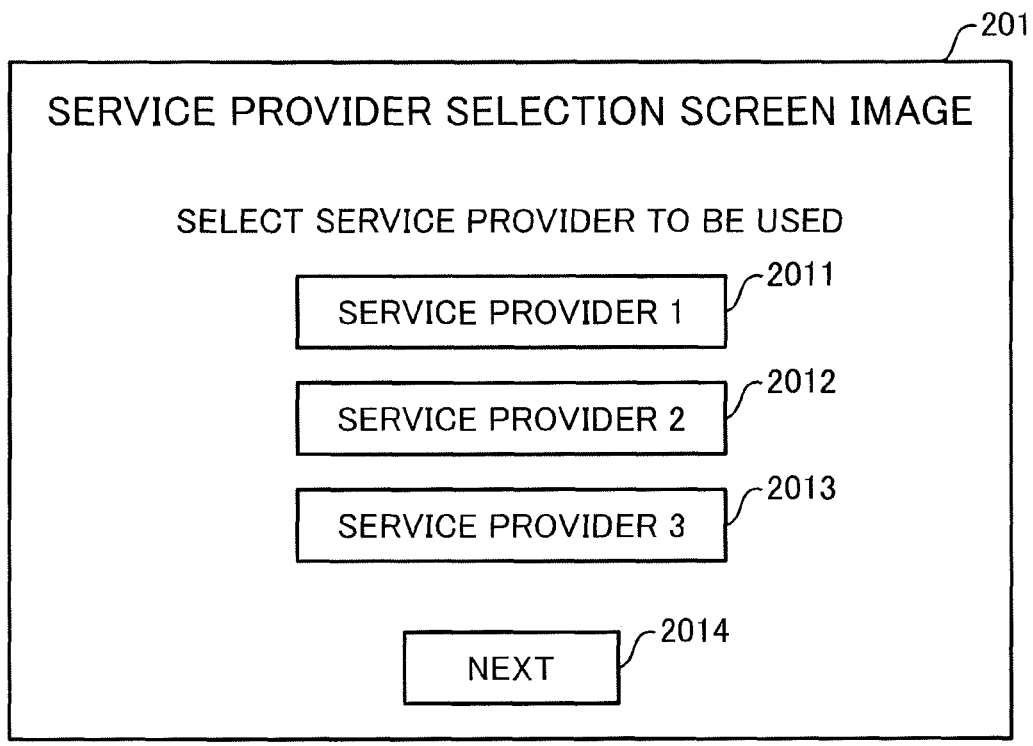
FIG. 7 shows an example of a service provider selection screen image displayed on a shared terminal in the embodiment.

FIG. 7 shows an example of a service provider selection screen image displayed on the shared terminal 2 in the embodiment.

The shared terminal 2 displays a service provider selection screen image 201 shown in FIG. 7 thereon. The service provider selection screen image 201 includes a plurality of service provider selection sections 2011 to 2013. Each of the service provider selection sections 2011 to 2013 shows a name of an available service provider. The user touches a specific service provider selection section showing the relevant name of the available service provider from among the service provider selection sections 2011 to 2013 on the service provider selection screen image 201. The touching of the one of the service provider selection sections 2011 to 2013 leads to selection of a specific available service provider to be used. For instance, the shared terminal 2 differentiates a display color for the touched service provider selection section from a display color for other service provider selection sections.

The service provider selection screen image 201 further includes a switch button 2014 for changing the screen image from the service provider selection screen image 201 to a user ID input screen image 202. Touching of the switch button 2014 results in displaying the user ID input screen image 202.

Referring back to FIG. 6, subsequently, the shared terminal 2 receives an input, by the user, of a user ID identifying the user in step S2.

Figure 8:
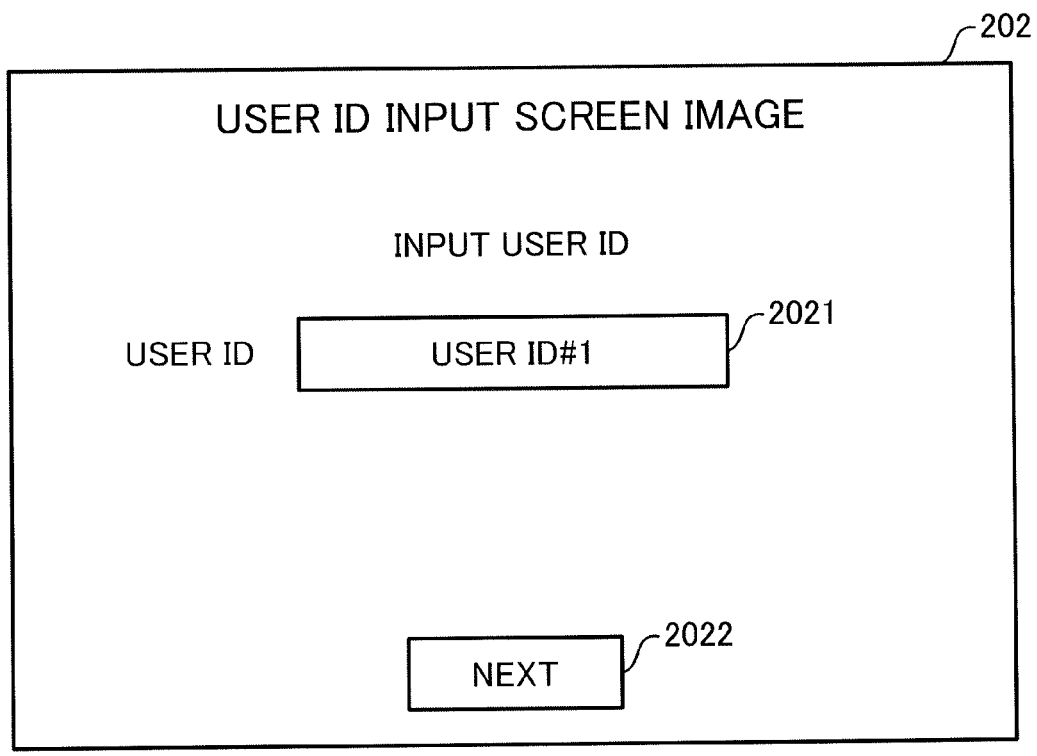
FIG. 8 shows an example of a user ID input screen image displayed on the shared terminal in the embodiment.

FIG. 8 shows an example of the user ID input screen image displayed on the shared terminal 2 in the embodiment.

The shared terminal 2 displays the user ID input screen image 202 shown in FIG. 8. The user ID input screen image 202 includes a user input section 2021 for receiving an input of the user ID identifying the user to use the service provided by the service provider selected on the service provider selection screen image 201. The user inputs the user ID of the user in the user ID input section 2021 on the user ID input screen image 202. The shared terminal 2 receives the input of the user ID by the user. The user ID input screen image 202 shows the input of "user ID#1" representing the user ID of the user.

The user ID input screen image 202 further includes a switch button 2022 for changing the screen image from the user ID input screen image 202 to a family ID input screen image 203. Touching of the switch button 2022 results in displaying the family ID input screen image 203.

Referring back to FIG. 6, subsequently, the shared terminal 2 receives an input, by the user, of a family ID identifying a family (group) to which the users belong to in step S3.

Next, in step S4, the shared terminal 2 transmits, to the ID management server 1, an ID registration request for registering the service ID identifying the service provider selected by the user, the user ID, and the family ID in association with one another in the ID management table. The ID registration request contains the service ID, the user ID, and the family ID.

Figure 9:
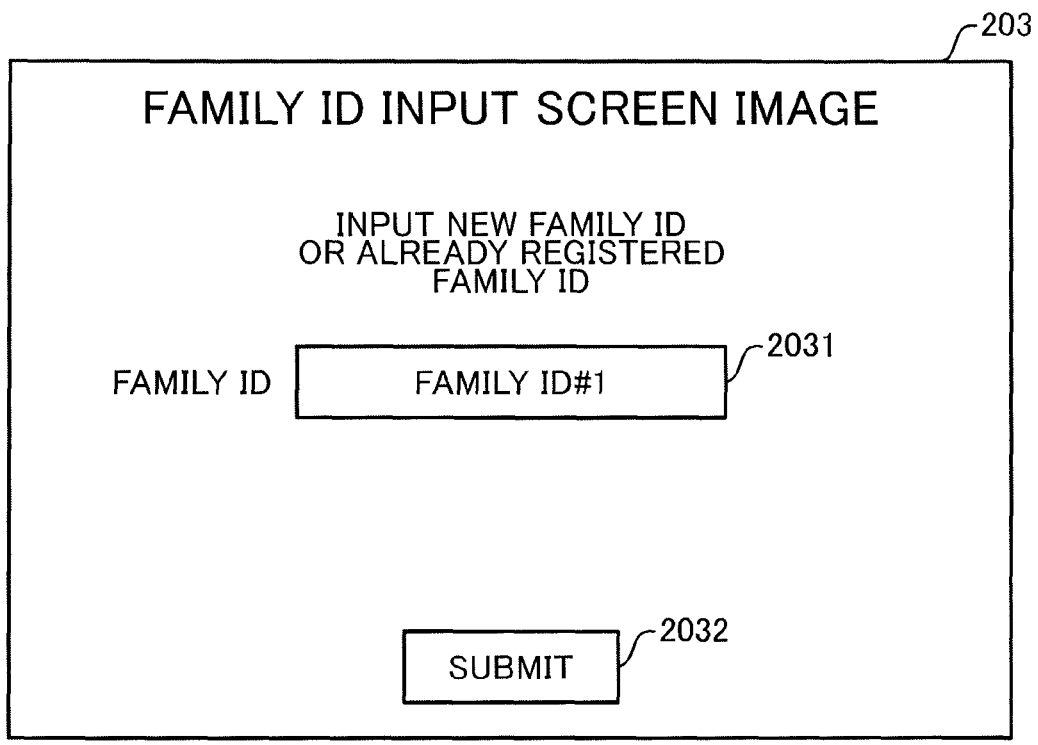
FIG. 9 shows an example of a family ID input screen image displayed on the shared terminal in the embodiment.

FIG. 9 shows an example of the family ID input screen image displayed on the shared terminal 2 in the embodiment.

The shared terminal 2 displays the family ID input screen image 203 shown in FIG. 9 thereon. The family ID input screen image 203 includes a family ID input section 2031 for receiving an input of the family ID identifying the family (group) to which the user belongs. The user inputs the family ID in the family ID input section 2031 on the family ID input screen image 203. The shared terminal 2 receives the input of the family ID by the user. Here, when the family 11) is not registered in the ID management server 1, the user inputs a new family ID. Contrarily, when the family ID is already registered in the ID management server 1 by another user, the user inputs the already registered family ID. The family ID input screen image 203 shows the input of "family ID#1" representing the family ID of the user.

The family ID input screen image 203 further includes a submission button 2032 for sending the service ID identifying the selected service provider, the input user ID, and the input family ID. Touching of the submission button 2032 results in transmitting, to the ID management server 1, an ID registration request containing the service ID, the user ID, and the family ID.

Referring back to FIG. 6, subsequently, the communication part 13 of the ID management server 1 receives the ID registration request transmitted by the shared terminal 2 in step S5.

Next, in step S6, the ID registration processing part 101 determines whether the family ID contained in the ID registration request received by the communication part 13 is already registered in the ID management table.

Here, when it is determined that the family ID is already registered in the ID management table (YES in step S6), the ID registration processing part 101 registers, in step S7, the user ID contained in the ID registration request and the service ID contained in the ID registration request in association with the registered family ID in the ID management table.

Contrarily, when it is determined that the family ID is not registered in the ID management table (NO in step S6), the ID registration processing part 101 registers, in step S8, a new family ID, the user ID contained in the ID registration request, and the service ID contained in the ID registration request in association with one another in the ID management table.

Subsequently, in step S9, the communication part 13 sends the user ID to the service providing server of the service provider identified by the service ID. The service providing server receives the user ID transmitted by the ID management server 1. The service providing server stores the received user ID in the memory. The service providing server authenticates, by using the user ID stored in the memory, the user ID contained in the acquisition request for the service information piece transmitted by the ID management server 1.

Next, in step S10, the communication part 13 transmits, to the shared terminal 2, an ID registration completion notification for notifying that registration of the family ID, the user ID, and the service ID is completed.

Subsequently, in step S11, the shared terminal 2 receives the ID registration completion notification transmitted by the ID management server 1.

Then, in step S12, the shared terminal 2 displays thereon a registration completion notification screen image for notifying the user that the registration of the family ID, the user ID, and the service ID is completed.

Although the shared terminal 2 receives the input of the new family ID by the user in the embodiment, this disclosure is not particularly limited thereto. The ID registration processing part 101 may create the new family ID while the shared terminal 2 avoids receiving the input of the new family ID by the user. In this case, the ID registration processing part 101 may create, for example, a family ID randomly having numerals and/or alphabets in combination.

Although the output destination management table predetermines output to either the shared terminal 2 or the individual terminals 3A, 3B, 3C for each of the service IDs identifying the service providers, this disclosure is not particularly limited thereto. The output to either the shared terminal 2 or the individual terminals 3A, 3B, 3C may be determined for each of a plurality of types of services provided by each of the service providers.

In this case, the shared terminal 2 may receive setting by a certain user as to whether at least either the shared terminal or the individual terminals share a service information piece for the users, or neither the shared terminal nor the individual terminals share the service information piece for the users, for each of the types of services.

Figure 10:
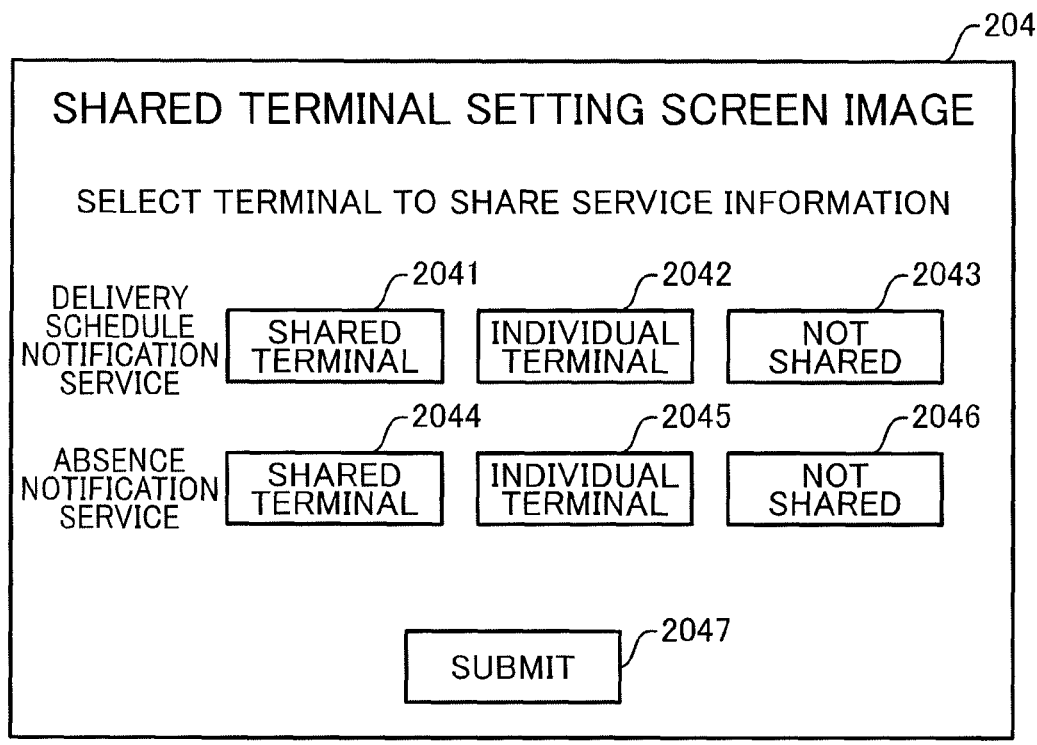
FIG. 10 shows an example of a shared terminal set screen image displayed on the shared terminal in the embodiment.

FIG. 10 shows an example of a shared terminal set screen image displayed on the shared terminal 2 in the embodiment.

The shared terminal 2 displays a shared terminal screen image 204 shown in FIG. 10 thereon. The shared terminal screen image 204 includes: first icons 2041, 2044 each indicating sharing of a service information piece at the shared terminal; second icons 2042, 2045 each indicating sharing of the service information piece among the individual terminals; and third icons 2043, 2046 indicating no sharing of the service information piece at the shared terminal and among the individual terminals, for each of the types of services. The user touches one of the first icons 2041, 2044, the second icons 2042, 2045, and the third icons 2043, 2046 on the shared terminal screen image 204 for each of the types of services. The user can simultaneously select one of the first icons 2041, 2044 and corresponding one of the second icons 2042, 2045. When the one of the first icons 2041, 2044 and the corresponding one of the second icons 2042, 2045 are selected, the service information piece is shared among the shared terminal and the individual terminals.

The shared terminal screen image 204 further includes a submission button 2047 for transmitting information indicating sharing of the service information piece selected by the user among one or more terminals or information indicating no sharing of the service information piece among any of the terminals. Touching of the submission button 2047 results in transmitting, to the ID management server 1, the information indicating the sharing of the service information piece selected by the user among the one or more terminals or the information indicating no sharing of the service information piece among any of the terminals. The ID management server 1 may store, in the output destination management table storage part 122, the output destination management table predetermining output of the service information piece to either the shared terminal or the individual terminals for each of the types of services.

The service information acquisition part 103 may determine, with reference to a type management table predetermining acquisition or non-acquisition of the service information piece about each of the types of services for the user IDs, at least one type concerning service information pieces to be acquired among the types for each of the user IDs, and acquire an available service information piece of at least one type, by using the user IDs, from the determined service information pieces of the at least one type.

FIG. 11 shows an example of the type management table stored in the ID management table storage part 121 in the embodiment.

The type management table associates a user ID with information indicating acquisition or non-acquisition of a service information piece about each of the types of services. The type management table shown in FIG. 11 associates, for example, a user ID#1, a user ID#2, and a user ID#3 with information indicating acquisition or non-acquisition of each service information piece of a first type, a second type, and a third type in a service ID#1. For instance, regarding the user ID#1, the service information piece of the first type is acquired, but the service information piece of each of the second type and the third type is not acquired.

In the ID registration process, when a user having a user ID#4 uses a service provided by a service provider identified by the service ID#1 for the first time, the shared terminal 2 may receive a determination as to whether to set a content for the user to the same set content as that for another user ID of the user having already used the service, i.e., that for any one of the user ID#1, the user ID#2, and the user ID#3. The set content indicates acquisition or non-acquisition of a service information piece for each of the types of services.

Next, a service information output process by the ID management server 1 in the embodiment of the disclosure will be described.

Figure 12:
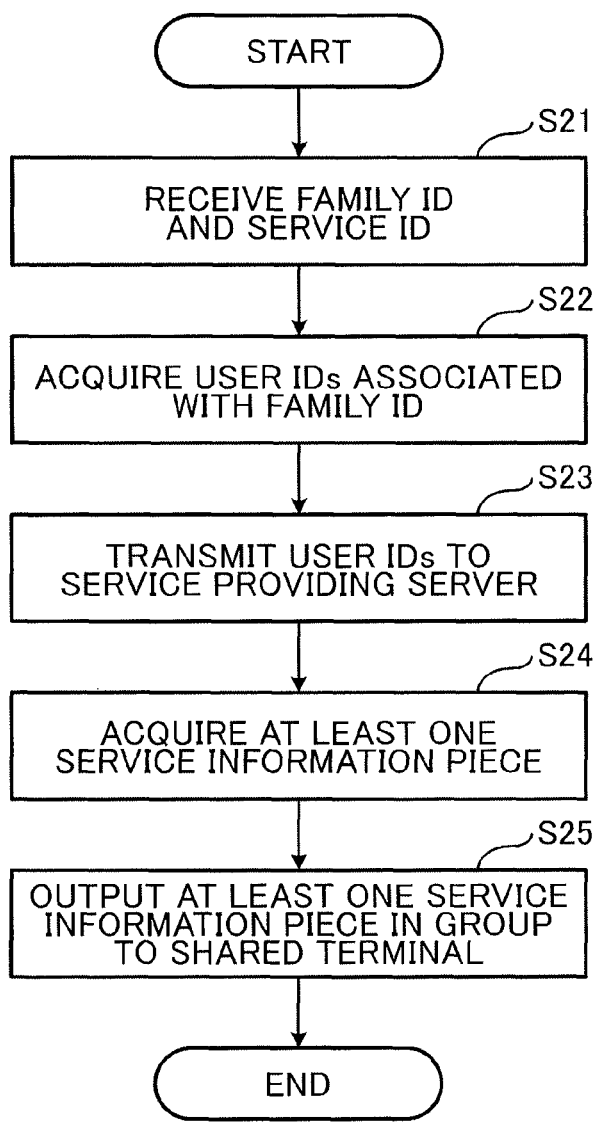
FIG. 12 is a flowchart explaining a service information output process by the ID management server in the embodiment of the disclosure.

FIG. 12 is a flowchart explaining the service information output process by the ID management server 1 in the embodiment of the disclosure.

First, in step S21, the communication part 13 receives a family ID transmitted by the shared terminal 2 and a service ID identifying a service provider providing an available service. The shared terminal 2 receives an input of each of the family ID and the service ID by the user.

The shared terminal 2 may receive only an initial input of the family ID by the user. In this case, the shared terminal 2 may store the initially input family ID in the memory 12. The shared terminal 2 may receive only the input of the service ID, and send the family ID stored in the memory 12 and the input service ID to the ID management server 1.

Next, in step S22, the user ID acquisition part 102 acquires, from the ID management table, a plurality of user IDs associated with the family ID received by the communication part 13.

The communication part 13 receives the family ID and the service ID in the embodiment, but may receive the user ID and the service ID. In this case, the user ID acquisition part 102 may specify a family ID associated with the received user ID, and acquire, from the ID management table, a plurality of user IDs associated with the specified family ID.

Subsequently, in step S23, the service information acquisition part 103 sends, via the communication part 13, the user IDs to the service providing server 4A identified by the service ID received by the communication part 13. The service providing server 4A authenticates the user IDs upon receiving the user IDs. After completion of the authentication of the user IDs, the service providing server 4A transmits at least one service information piece corresponding to each of the user IDs to the ID management server 1.

Next, in step S24, the service information acquisition part 103 acquires, via the communication part 13, the at least one service information piece transmitted by the service providing server 4A. The communication part 13 receives the at least one service information piece transmitted by the service providing server 4A, and outputs the received at least one service information piece to the service information acquisition part 103.

Then, in step S25, the service information output part 104 outputs, via the communication part 13, the at least one service information piece acquired by the service information acquisition part 103 in a group to the shared terminal 2. At this time, the communication part 13 transmits the at least one service information piece in the group to the shared terminal 2. The shared terminal 2 displays, upon receiving the at least one service information piece in the group, the at least one service information piece thereon. The at least one service information piece displayed on the shared terminal 2 is browsable by the users.

As described above, a plurality of user IDs associated with a family ID identifying a group to which a plurality of users belong is acquired, at least one service information piece about at least one available service among a plurality of service information pieces about a plurality of services available for each of the user IDs is acquired, and the acquired at least one service information piece is output in the group to the shared terminal. Then, the shared terminal 2 shared by the users shows the at least one service information piece in the group.

Therefore, the users can share the service information piece associated with each of the user IDs, and the convenience of the users is improvable.

Although the user ID acquisition part 102 acquires, from the ID management table, the user IDs associated with the family ID received by the communication part 13 when the family ID and the service ID transmitted by the shared terminal 2 are received in the embodiment, the disclosure is not particularly limited thereto. The user ID acquisition part 102 may periodically (per predetermined time) acquire the user IDs associated with the family ID from the ID management table even without receiving the family ID and the service ID. Further, the service information acquisition part 103 may periodically (per predetermined time) send the acquired user IDs to the service providing server, and acquire at least one service information piece.

Although the user IDs associated with the family ID are acquired from the ID management table and the acquired user IDs are sent to the service providing server 4A in the embodiment, the disclosure is not particularly limited thereto. The user IDs associated with the family ID and a plurality of passwords associated with the user IDs may be acquired from the ID management table. Each password is registered together with the corresponding user ID by the user in advance, and stored in association with the user ID in the ID management table. In this case, the acquired user IDs and corresponding passwords are sent to the service providing server 4A. The service providing server 4A performs authentication by using each received user ID and password. In this manner, the authentication is more accurately performed. The password may include a one-time password transmitted to the individual terminal associated with the corresponding user ID.

Furthermore, for instance, one user having purchased an article as a present for another user in a family thereof may not want the other user to know delivery of the purchased article. In such a case, in the embodiment, the one user may set, at the purchase of the article, whether to share a relevant service information piece among a plurality of users. An individual terminal of the one user may accept setting as to whether to share the service information piece among the users when receiving the purchase of the article by the one user. In acceptance of setting of not sharing the service information piece among the users, the ID management server 1 avoids transmitting the service information piece to the shared terminal 2 regardless of presetting of outputting a service information piece about purchase of an article by the one user to the shared terminal 2. Alternatively, the individual terminal of the one user may receive, after the purchase of article by the one user, a confirmation mail for confirmation as to whether to share the service information piece among the users, and then accept the setting as to whether to share the service information piece among the users.

Next, a specific example of a service in the embodiment of the disclosure will be described.

Figure 13:
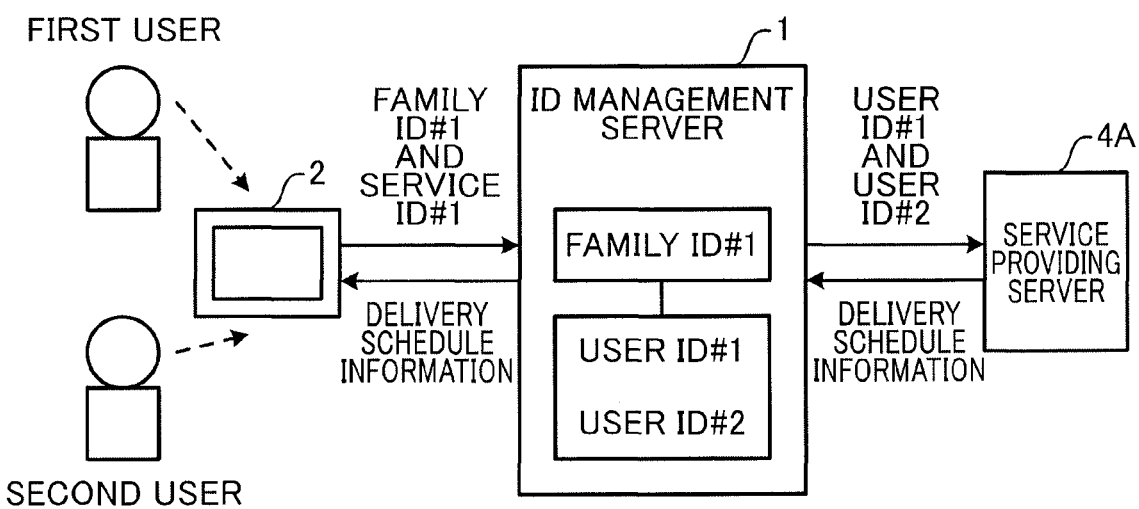
FIG. 13 is an example of a delivery schedule notification service in the embodiment of the disclosure.

FIG. 13 is an example of a delivery schedule notification service in the embodiment of the disclosure.

The delivery schedule notification service is one of the types of the article delivery service. In the delivery schedule notification service, a user is notified of a scheduled delivery date and time of an article. Service information in the delivery schedule notification service represents delivery schedule information about a scheduled delivery date and time of an article.

First, of first and second users, the second user inputs a family ID#1 and a service ID#1 to the shared terminal 2. The shared terminal 2 sends the family ID#1 and the service ID#1 input by the second user to the ID management server 1.

Next, the ID management server 1 acquires a user ID#1 and a user ID#2 associated with the received family ID#1. The family ID#1 is associated with the user ID#1 and the user ID#2. The user ID#1 is an identifier identifying the first user, and the user ID#2 is an identifier identifying the second user.

Subsequently, the ID management server 1 sends the acquired user ID#1 and user ID#2 to the service providing server 4A of the service provider identified by the received service ID#1. The ID management server 1 stores, in advance, the service ID, and an address of the service providing server to which the service provider identified by the service ID provides service information in association with each other.

Then, the service providing server 4A receives the user ID#1 and the user ID#2. The service providing server 4A manages a delivery state of an article for each of the user IDs. The service providing server 4A transmits, to the ID management server 1, delivery schedule information corresponding to each of the received user ID#1 and user ID#2. Here, delivery of the article ordered by the first user is scheduled, and delivery schedule information for the user ID#1 is transmitted to the ID management server 1.

Subsequently, the ID management server 1 receives the delivery schedule information corresponding to the user ID#1 as transmitted by the service providing server 4A.

Next, the ID management server 1 transmits the received delivery schedule information corresponding to the user ID#1 to the shared terminal 2. Although the delivery schedule information is transmitted to the shared terminal 2 under a setting of an output destination of a service information piece to the shared terminal 2 in the embodiment, the delivery schedule information may be transmitted to the respective individual terminals of the first user and the second user under a setting of the output destination of the service information piece to each individual terminal. Alternatively, the service providing server 4A may directly transmit the delivery schedule information to the individual terminal of the first user.

Then, the shared terminal 2 receives the delivery schedule information corresponding to the user ID#1 and transmitted by the ID management server 1. The shared terminal 2 displays the delivery schedule information corresponding to the received user ID#1 thereon. The delivery schedule information is displayed by way of an E-mail or an application installed in the shared terminal 2.

Conventionally, delivery schedule information about an article for a first user has been transmitted to only an individual terminal owned by the first user. By contrast, in the embodiment, the delivery schedule information about the article for the first user is transmitted to the shared terminal 2 shared by the first user and the second user.

Although the delivery schedule information displayed on the shared terminal 2 shows the scheduled delivery date and time of the article ordered by the first user, the information is browsable by the second user as well as the first user. Therefore, the second user can confirm the delivery schedule information even in absence of the first user.

Figure 14:
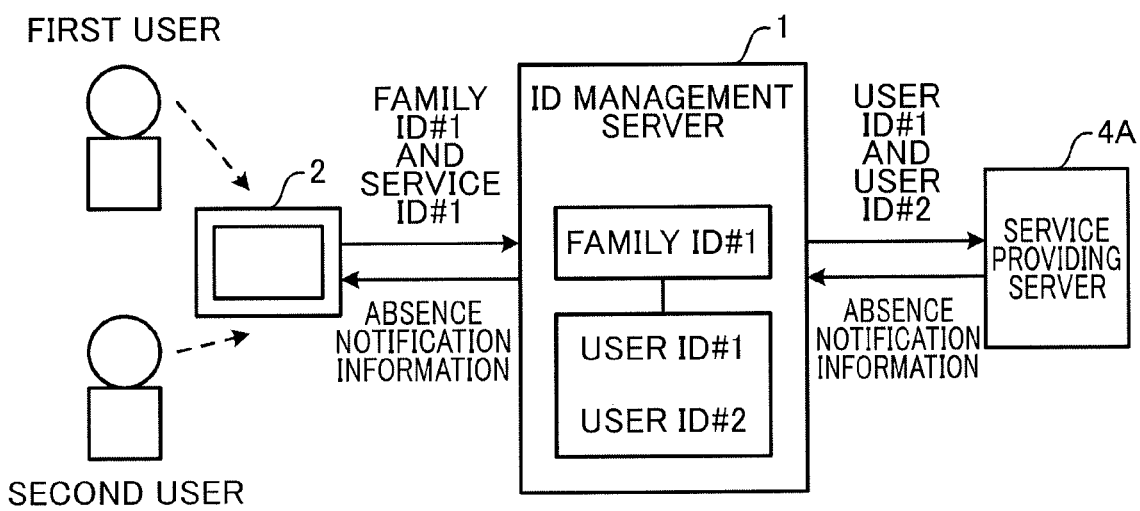
FIG. 14 shows an example of an absence notification service in the embodiment of the disclosure.

FIG. 14 is an example of an absence notification service in the embodiment of the disclosure.

The absence notification service is one of the types of the article delivery service. In the absence notification service, a user is notified that a deliverer has carried the article back due to the absence of the user. A service information piece in the absence notification service represents absence notification information indicating that the deliverer has carried the article back due to the absence of the user.

First, of first and second users, the second user inputs a family ID#1 and a service ID#1 to the shared terminal 2. The shared terminal 2 sends the family ID#1 and the service ID#1 input by the second user to the ID management server 1.

Next, the ID management server 1 acquires a user ID#1 and a user ID#2 associated with the received family ID#1. The family ID#1 is associated with the user ID#1 and the user ID#2. The user ID#1 is an identifier identifying the first user, and the user ID#2 is an identifier identifying the second user.

Subsequently, the ID management server 1 sends the acquired user ID#1 and user ID#2 to the service providing server 4A identified by the received service ID. The ID management server 1 stores, in advance, the service ID, and an address of the service providing server to which the service provider identified by the service ID provides service information in association with each other.

Then, the service providing server 4A receives the user ID#1 and the user ID#2. The service providing server 4A manages a delivery state of an article for each of the user IDs. The service providing server 4A transmits, to the ID management server 1, the absence notification information about the received user ID#1 and user ID#2. The absence notification information includes, for example, a date and time of arrival of a deliverer at a house of a user in absence thereof. Here, delivery of the article ordered by the first user is scheduled, and the absence notification information corresponding to the user ID#1 is transmitted to the ID management server 1.

Subsequently, the ID management server 1 receives the absence notification information corresponding to the user ID#1 as transmitted by the service providing server 4A.

Next, the ID management server 1 transmits the received absence notification information corresponding to the user 1D#1 to the shared terminal 2. Although the absence notification information is transmitted to the shared terminal 2 under a setting of an output destination of a service information piece to the shared terminal 2 in the embodiment, the absence notification information may be transmitted to the respective individual terminals of the first user and the second user under a setting of the output destination of the service information piece to each individual terminal. Alternatively, the service providing server 4A may directly transmit the absence notification information to the individual terminal of the first user.

Then, the shared terminal 2 receives the absence notification information corresponding to the user ID#1 and transmitted by the ID management server 1. The shared terminal 2 displays the absence notification information corresponding to the received user ID#1 thereon. The absence notification information is displayed by way of an E-mail or an application installed in the shared terminal 2.

Conventionally, absence notification information about an article for a first user has been transmitted to only an individual terminal owned by the first user. By contrast, in the embodiment, the absence notification information about the article for the first user is transmitted to the shared terminal 2 shared by the first user and the second user.

Although the absence notification information displayed on the shared terminal 2 shows that the deliverer has carried back the article ordered by the first user, the information is browsable by the second user as well as the first user. Therefore, the second user can confirm the absence notification information even in absence of the first user.

Figure 15:
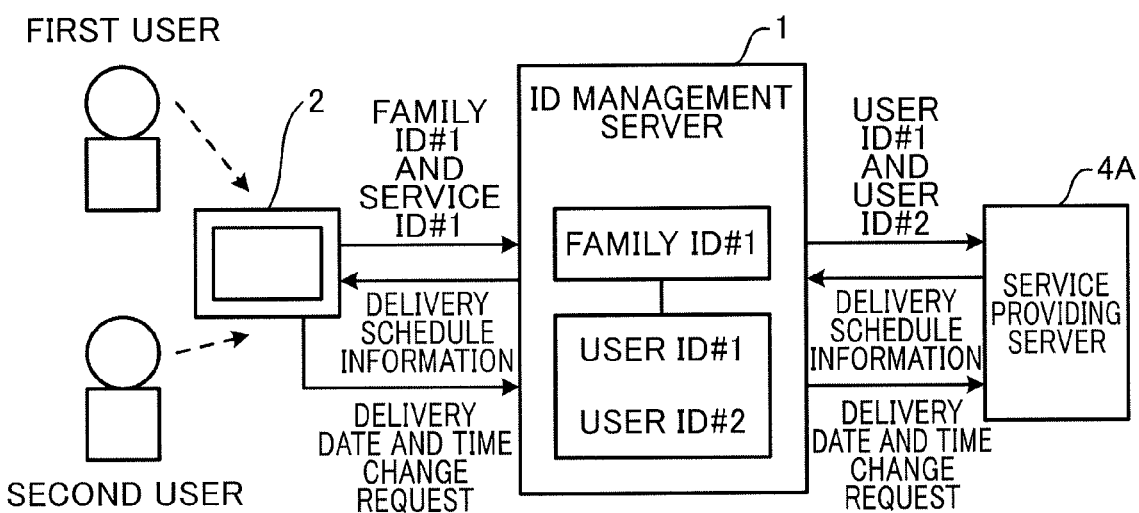
FIG. 15 shows an example of a delivery date and time change service in the embodiment of the disclosure.

FIG. 15 is an example of a delivery date and time change service in the embodiment of the disclosure.

The delivery date and time change service is one of the types of the article delivery service. The delivery date and time change service is an example of the set content change service. In the delivery date and time change service, a change in a delivery date and time of an article by a user is received. The delivery date and time change service follows the delivery schedule notification service.

First, of first and second users, the second user inputs a family ID#1 and a service ID#1 to the shared terminal 2. The shared terminal 2 sends the family ID#1 and the service ID#1 input by the second user to the ID management server 1.

A process from the sending of the family ID#1 and the service ID#1 to the ID management server 1 to receipt of delivery schedule information by the shared terminal 2 is the same as the process in the delivery schedule notification service.

Next, the shared terminal 2 receives a change in the delivery date and time by the second user. The second user inputs a changed delivery date and time from a current scheduled delivery date and time. The shared terminal 2 transmits a delivery date and time change request containing the changed delivery date and time to the ID management server 1.

Then, the ID management server 1 receives the delivery date and time change request transmitted by the shared terminal 2. The ID management server 1 transmits the delivery date and time change request to the service providing server 4A concurrently with sending the user ID#1 thereto.

Subsequently, the service providing server 4A receives the delivery date and time change request together with the user ID#1. The service providing server 4A changes the scheduled delivery date and time corresponding to the user ID#1 to the delivery date and time contained in the received delivery date and time change request.

Conventionally, a change in a scheduled delivery date and time of an article for a first user has been performed with only an individual terminal owned by the first user. By contrast, in the embodiment, a change in the scheduled delivery date and time of the article for the first user is performed with the shared terminal 2 shared by the first user and the second user.

Although the scheduled delivery date and time displayed on the shared terminal 2 shows the scheduled delivery date and time of the article ordered by the first user, the scheduled delivery date and time is changeable by the second user as well as the first user. Therefore, the second user can change the scheduled delivery date and time at the second user's convenience even in absence of the first user.

Figure 16:
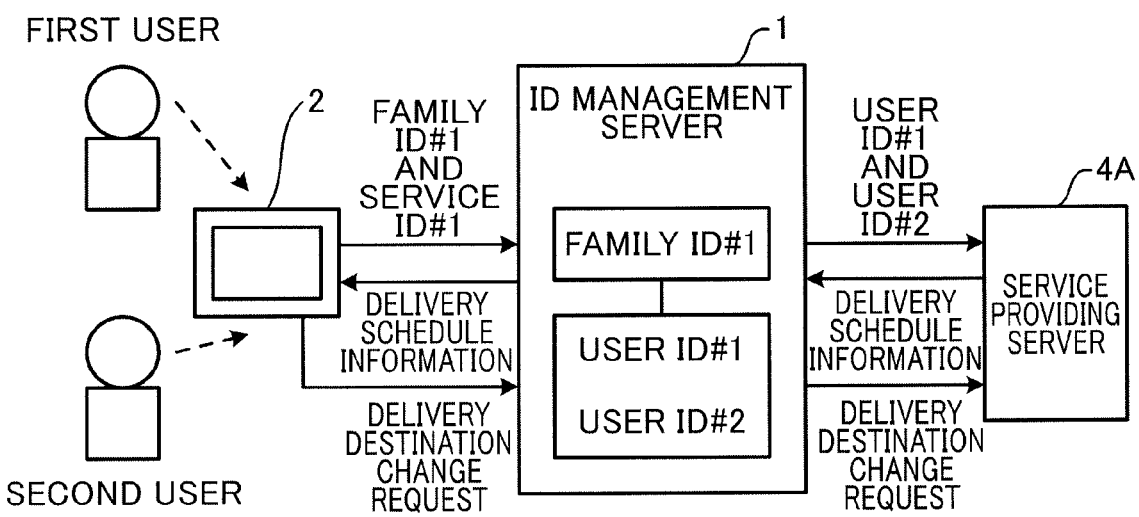
FIG. 16 shows an example of a delivery destination change service in the embodiment of the disclosure.

FIG. 16 is an example of a delivery destination change service in the embodiment of the disclosure.

The delivery destination change service is one of the types of the article delivery service. The delivery destination change service is an example of the set content change service. In the delivery destination change service, a change in a delivery destination of an article by a user is received. The delivery destination change service follows the delivery schedule notification service.

First, of first and second users, the second user inputs a family ID#1 and a service ID#1 to the shared terminal 2. The shared terminal 2 sends the family ID#1 and the service ID#1 input by the second user to the ID management server 1.

A process from the sending of the family ID#1 and the service ID#1 to the ID management server 1 to receipt of delivery schedule information by the shared terminal 2 is the same as the process in the delivery schedule notification service.

Next, the shared terminal 2 receives a change in the delivery destination by the second user. The second user inputs a changed delivery destination from a current scheduled delivery destination. The shared terminal 2 transmits a delivery destination change request containing the changed delivery destination to the ID management server 1. For instance, when the house is designated as the current scheduled delivery destination, the scheduled delivery destination is changeable to, for example, a convenience store or a delivery center near the house.

Then, the ID management server 1 receives the delivery destination change request transmitted by the shared terminal 2. The ID management server 1 transmits the delivery destination change request to the service providing server 4A concurrently with sending the user ID#1 thereto.

Subsequently, the service providing server 4A receives the delivery destination change request together with the user ID#1. The service providing server 4A changes the scheduled delivery destination corresponding to the user ID#1 to the delivery destination contained in the received delivery destination change request.

Conventionally, a change in a scheduled delivery destination of an article for a first user has been performed with an individual terminal owned by the first user. By contrast, in the embodiment, the change in the scheduled delivery destination of the article for the first user is performed with the shared terminal 2 shared by the first user and the second user.

Although the scheduled delivery destination displayed on the shared terminal 2 shows the scheduled delivery destination of the article ordered by the first user, the scheduled delivery destination is changeable by the second user as well as the first user. Therefore, the second user can change the scheduled delivery destination at the second user's convenience even in absence of the first user.

In the embodiment, each constituent element may be realized with dedicated hardware or by executing a software program suitable for the constituent element. Each constituent element may be realized by a program execution unit, such as a CPU or a processor, reading out and executing a software program recorded on a recording medium, such as a hard disk or a semiconductor memory. Other independent computer system may implement a program by recording the program in a recording medium to be transferred, or transferring the program via a network.

A part or all of functions of the device according to the embodiment of the disclosure are typically realized as a large scale integration (LSI), which is an integrated circuit. These functions may be formed as separate chips, or some or all of the functions may be included in one chip. The circuit integration is not limited to the LSI, and may be realized with a dedicated circuit or a general-purpose processor. A field programmable gate array (FPGA) that is programmable after manufacturing of an LSI or a reconfigurable processor in which connections and settings of circuit cells within the LSI are reconfigurable may be used.

A part or all of functions of the device according to the embodiment of the present disclosure may be implemented by a processor, such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

The technology according to the disclosure permits a plurality of users to share a service information piece associated with each of a plurality of user IDs and achieves improvement in the convenience of the users, and accordingly, is useful to acquire service information available for the user IDs by using the user IDs identifying the users.

The invention claimed is:

1. An information processing method, executed by a computer, comprising:
   acquiring a plurality of user IDs respectively identifying a plurality of users associated with a group ID identifying a group to which the users belong;
   acquiring, by using the user IDs, at least one service information piece about at least one available service among a plurality of service information pieces about a plurality of services available for each of the user IDs; and
   outputting the acquired at least one service information piece in the group to a shared terminal shared by the users associated with the group ID to cause the shared terminal to show the at least one service information piece in the group, wherein,
   in the acquisition of the at least one service information piece, the user IDs are sent to a service providing server that provides the service information pieces, and the at least one service information piece about the available service is received from the service providing server.

2. The information processing method according to claim 1, wherein,
   in the output of the at least one service information piece, the acquired at least one service information piece is output in the group to the shared terminal, and the acquired at least one service information piece is output to a plurality of individual terminals respectively associated with the user IDs.

3. An information processing method, executed by a computer, comprising:
   acquiring a plurality of user IDs respectively identifying a plurality of users associated with a group ID identifying a group to which the users belong;
   acquiring, by using the user IDs, at least one service information piece about at least one available service among a plurality of service information pieces about a plurality of services available for each of the user IDs;
   determining, with reference to an output destination management table predetermining output of the service information piece to either a shared terminal shared by the users associated with the group ID or a plurality of individual terminals respectively associated with the user IDs for each of a plurality of service providing servers, to output the acquired at least one service information piece to either the shared terminal or the individual terminals for the service providing server having provided the at least one service information piece; and
   outputting, when the shared terminal is determined to be an output destination, the acquired at least one service information piece in the group to the shared terminal to cause the shared terminal to show the at least one service information piece in the group, and outputting, when the individual terminals are determined to be the output destinations, the acquired at least one service information piece to the plurality of individual terminals.

4. An information processing method, executed by a computer, comprising:
   acquiring a plurality of user IDs respectively identifying a plurality of users associated with a group ID identifying a group to which the users belong;
   acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group, wherein the services include a set content change service of receiving a change which has been made in a set content by a user, the information processing method further comprising:

receiving, from the shared terminal, a setting change request of demanding a change in the set content in the set content change service by a certain user of the users; and, with reference to a setting change management table predetermining permission or prohibition of a change in a set content in the set content change service by the users for the user IDs, transmitting the setting change request to the service providing server by using a user ID identifying the certain user when the change in the set content in the set content change service by the users is permitted for the user ID identifying the certain user, and prohibiting the change in the set content in the set content change service by the certain user when the change in the set content in the set content change service by the users is not permitted for the user ID identifying the certain user.

5. An information processing method, executed by a computer, comprising:

acquiring a plurality of user IDs respectively identifying a plurality of users associated with a group ID identifying a group to which the users belong;

acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group, wherein the service information pieces include service information pieces about a plurality of types of services, and, in the acquisition of the at least one service information piece, it is determined, with reference to a type management table predetermining acquisition or non-acquisition of the service information piece about each of the types for the user IDs, at least one type concerning service information pieces to be acquired among the types for each of the user IDs, and an available service information piece of at least one type is acquired, by using the user IDs, from the determined service information pieces of the at least one type.

6. A non-transitory computer readable recording medium storing a program for processing information by causing a computer to execute:

acquiring a plurality of user IDs respectively identifying a plurality of users associated with a group ID identifying a group to which the users belong;

acquiring, by using the user IDs, at least one service information piece about at least one available service among a plurality of service information pieces about a plurality of services available for each of the user IDs; and outputting the acquired at least one service information piece in the group to a shared terminal shared by the users associated with the group ID to cause the shared terminal to show the at least one service information piece in the group, wherein, in the acquisition of the at least one service information piece, the user IDs are sent to a service providing server that provides the service information pieces, and the at least one service information piece about the available service is received from the service providing server.

7. An information processing device, comprising:

a first acquisition circuit that acquires a plurality of user IDs respectively identifying a plurality of users associated with a group ID identifying a group to which the users belong;

a second acquisition circuit that acquires, by using the user IDs, at least one service information piece about at least one available service among a plurality of service information pieces about a plurality of services available for each of the user IDs; and an output circuit that outputs the acquired at least one service information piece in the group to a shared terminal shared by the users associated with the group ID to cause the shared terminal to show the at least one service information piece in the group, wherein, the second acquisition circuit sends the user IDs to a service providing server that provides the service information pieces, and receives the at least one service information piece about the available service from the service providing server.

* * * * *